US007850933B2

(12) United States Patent
Yang et al.

(10) Patent No.: US 7,850,933 B2
(45) Date of Patent: Dec. 14, 2010

(54) NANOPARTICLES, METHODS OF MAKING, AND APPLICATIONS USING SAME

(75) Inventors: Zhihao Yang, Vestal, NY (US); Hao Wang, Potomac, MD (US); Zhiyong Xu, Houghton, MI (US)

(73) Assignee: NanoMas Technologies, Inc., Binghamton, NY (US)

( * ) Notice: Subject to any disclaimer, the term of this patent is extended or adjusted under 35 U.S.C. 154(b) by 301 days.

(21) Appl. No.: 11/734,692

(22) Filed: Apr. 12, 2007

(65) Prior Publication Data

US 2008/0124268 A1 May 29, 2008

Related U.S. Application Data

(60) Provisional application No. 60/791,325, filed on Apr. 12, 2006.

(51) Int. Cl.
   *C22B 3/00* (2006.01)
(52) U.S. Cl. .......................................................... 423/1
(58) Field of Classification Search ....................... None
   See application file for complete search history.

(56) References Cited

U.S. PATENT DOCUMENTS

| 5,879,715 | A * | 3/1999 | Higgins et al. .............. 424/489 |
| 6,613,721 | B1 * | 9/2003 | Kernizan et al. ............. 508/103 |
| 6,645,444 | B2 * | 11/2003 | Goldstein ........................ 423/1 |
| 2005/0191492 | A1 * | 9/2005 | Yadav .......................... 428/407 |

FOREIGN PATENT DOCUMENTS

| WO | WO9714176 | * | 3/1997 |
| WO | WO 97/24224 A | | 7/1997 |

OTHER PUBLICATIONS

Brust et al, synthesis of thiol-derivatised gold nanoparticles in a two phase liquid liquid system, 1994, journal of chemical society, pp. 801-802.*
International Search Report, PCT/US2007/009013 (Oct. 9, 2007) (2 pages).

* cited by examiner

*Primary Examiner*—Melvin C Mayes
*Assistant Examiner*—Stefanie Cohen
(74) *Attorney, Agent, or Firm*—Foley & Lardner LLP

(57) ABSTRACT

Methods for forming nanoparticles under commercially attractive conditions. The nanoparticles can have very small size and high degree of monodispersity. Low temperature sintering is possible, and highly conductive films can be made. Semiconducting and electroluminescent films can be also made. One embodiment provides a method comprising: (a) providing a first mixture comprising at least one nanoparticle precursor and at least one first solvent for the nanoparticle precursor, wherein the nanoparticle precursor comprises a salt comprising a cation comprising a metal; (b) providing a second mixture comprising at least one reactive moiety reactive for the nanoparticle precursor and at least one second solvent for the reactive moiety, wherein the second solvent phase separates when it is mixed with the first solvent; and (c) combining said first and second mixtures in the presence of a surface stabilizing agent, wherein upon combination the first and second mixtures phase-separate and nanoparticles are formed.

103 Claims, 7 Drawing Sheets

(a)

(b)

(a)

(b)

NANOPARTICLES, METHODS OF MAKING, AND APPLICATIONS USING SAME

RELATED APPLICATIONS

This application claims priority to U.S. provisional application Ser. No. 60/791,325 filed on Apr. 12, 2006, which is hereby incorporated by reference in its entirety.

BACKGROUND

New and better nanostructured materials are needed for various applications in diverse industries including biotechnology, diagnostics, energy, and electronics, among others. For example, electronics manufacturers are continually striving to decrease costs and increase functionality of electronic devices and components. One emerging strategy for cost reduction is directly printing electronics onto low-cost plastic films using solution-based inks. The so called Printed Electronics refers to the technologies of manufacturing functional electronic devices using the processes that have been used in the printing industry, such as ink-jet printing, gravure printing, screen printing, flexographic printing, off-set printing, etc. in a high through-put and low-cost reel-to-reel (R2R) fashion. One example of the printed electronics is to construct electrical circuits using inkjet printing of patterns of metal nanoparticles to form conductors. This process is discussed in, for example, "Applications of Printing Technology in Organic Electronics and Display Fabrication", by V. Subramanian, presented at the Half Moon Bay Maskless Lithography Workshop, DARPA/SRC, Half Moon Bay, Calif., Nov. 9-10, 2000.

Nanoparticle material properties can differ from counterpart bulk materials. For example, one of most characteristic feature of nanoparticles is the size-dependent surface melting point depression. (Ph. Buffat et al.; "Size effect on the melting temperature of gold particles" Physical Review A, Volume 13, Number 6, June 1976, pages 2287-2297; A. N. Goldstein et al. "Melting in Semiconductor Nanocrystals" Science, Volume 256, Jun. 5, 2002, pages 1425-1427; and K. K. Nanda et al.; "Liquid-drop model for the size-dependent melting of low-dimensional systems" Physical Review, A 66 (2002), pages 013208-1 thru 013208-8.) This property would enable the melting or sintering of the metal nanoparticles into polycrystalline films with good electric conductivity. An example has been shown by D. Huang, F. Liao, S. Molesa, D. Redinger, and V. Subramanian in "Plastic-Compatible Low Resistance Printable Gold Nanoparticle Conductors for Flexible Electronic" Journal of the Electrochemical Society, Vol 150, p 412-417, 2003. In order to process the nanoparticle inks on plastic substrate, it is necessary to get the particle sintering temperature below the glass transition temperature (Tg) of the substrate materials, generally less than 200° C. As pointed out in the literature above, it requires the nanoparticles having the dimensions less than 10 nm.

A need exists to find better nanoparticle synthetic routes, particularly at very small dimensions and in commercially feasible ways. For example, a need exists to synthesis inorganic nanoparticles with dimensions less than 20 nm, especially those with dimensions less than 10 nm, in liquid media by commercial mass production, due to the difficulties in control the particle nucleation and growth.

US patent publications 2006/0003262 to Yang et al; and 2006/0263725 to Nguyen et al; describe fabrication and applications of nanoparticles with use of dyes. Here, a solution process for nanoparticle synthesis is briefly described but the process is focused by a number of factors important for commercialization including limitations on the general applicability of the process to various metals and materials including, for example, silver and semiconductors, limitations in use of thiol stabilizing agents, avoid formation of undesired sulfides, and limitations in use of phase transfer catalysts. For example, some phase transfer catalysts can be toxic.

A need exists to find better, more efficient, more versatile methods for scale up for mass production of nanoparticles with low cost process.

SUMMARY

Various embodiments described and claimed herein encompass methods of making, compositions, inks, methods of using, articles and devices, and the like.

One embodiment provides a method comprising:

(a) providing a first mixture comprising at least one nanoparticle precursor and at least one first solvent for the nanoparticle precursor, wherein the nanoparticle precursor comprises a salt comprising a cation comprising a metal;

(b) providing a second mixture comprising at least one reactive moiety reactive for the nanoparticle precursor and at least one second solvent for the reactive moiety, wherein the second solvent phase separates when it is mixed with the first solvent; and (c) combining said first and second mixtures in the presence of a surface stabilizing agent, wherein upon combination the first and second mixtures phase-separate and nanoparticles are formed.

Another embodiment provides a method comprising:

(a) providing a first mixture comprising at least one nanoparticle precursor and at least one first solvent for the nanoparticle precursor, wherein the nanoparticle precursor comprises a salt comprising an inorganic cation;

(b) providing a second mixture comprising at least one reactive moiety reactive for the nanoparticle precursor and at least one second solvent for the reactive moiety, wherein the second solvent phase separates when it is mixed with the first solvent; and (c) combining said first and second mixtures in the presence of a surface stabilizing agent, wherein upon combination the first and second mixtures phase-separate and nanoparticles are formed.

A method comprising:

(a) providing a first mixture comprising at least one nanoparticle precursor comprising a metal and at least one first solvent;

(b) providing a second mixture comprising at least one moiety reactive with the nanoparticle precursor and at least one second solvent, wherein the second solvent phase separates when it is mixed with the first solvent; wherein the first and second mixtures are provided without substantially use of phase transfer catalyst; and (c) combining said first and second mixtures in the presence of a surface stabilizing agent, wherein the first and second mixtures phase-separate and nanoparticles are formed.

A method comprising:

(a) providing a first mixture comprising at least one nanoparticle precursor and at least one first solvent, (b) providing a second mixture comprising at least one moiety reactive with the nanoparticle precursor and at least one second solvent, wherein the second solvent phase separates when it is mixed with the first solvent; and (c) combining said first and second mixtures in the presence of a surface stabilizing agent comprising an amino group or a carboxylic acid group, wherein the first and second mixtures phase-separate and form nanoparticles.

Also provided is a method comprising:

(a) providing a first mixture comprising at least one first solvent and at least one nanoparticle precursor, wherein the nanoparticle precursor comprises a metal which is not gold;

(b) providing a second mixture comprising at least one second solvent and at least one reactive moiety reactive with the nanoparticle precursor, wherein the second solvent phase separates when it is mixed with the first solvent; and (c) combining said first and second mixtures in the presence of a surface stabilizing agent, wherein the first and second mixtures phase-separate, and form nanoparticles.

Also provided is a method comprising:

(a) providing a first mixture comprising at least one first solvent and at least one nanoparticle precursor, wherein the nanoparticle precursor comprises a metal;

(b) providing a second mixture comprising at least one second solvent and at least one reactive moiety reactive with the nanoparticle precursor, wherein the second solvent phase separates when it is mixed with the first solvent; and (c) combining said first and second mixtures in the presence of a surface stabilizing agent which is not a thiol, wherein the first and second mixtures phase-separate, and form nanoparticles.

Another embodiment is a method comprising:

reacting at least two precursor materials in the presence of at least one surface stabilizing agent and two immiscible solvents to form inorganic nanoparticles at the interface of the solvents, wherein a first precursor comprises a metal ion and a second precursor comprises a reducing agent.

Another embodiment provides a method consisting essentially of:

(a) providing a first mixture consisting essentially of at least one nanoparticle precursor and at least one first solvent for the nanoparticle precursor, wherein the nanoparticle precursor consists essentially of a salt comprising a cation comprising a metal;

(b) providing a second mixture consisting essentially of at least one reactive moiety reactive for the nanoparticle precursor and at least one second solvent for the reactive moiety, wherein the second solvent phase separates when it is mixed with the first solvent; and (c) combining said first and second mixtures in the presence of a surface stabilizing agent, wherein upon combination the first and second mixtures phase-separate and nanoparticles are formed.

Another embodiment provides a composition comprising:

nanoparticles comprising an amine or carboxylic acid surface stabilizing agent dispersed in at least one solvent, wherein the concentration of the nanoparticles is about 1 wt. % to about 70 wt. % and the nanoparticles have an average size of about 1 nm to about 20 nm, and a monodispersity showing standard deviation of about 3 nm or less.

Another embodiment provides a composition comprising metallic nanoparticles showing a DSC sintering temperature exothermic peak between about 110° C. to about 160° C.

Advantages include ease of manufacturing, widely compatible with low cost processes used in chemical industry, scalability for full scale production, good control of particle size and dispersability, good monodispersity, ultra-small particle size, low annealing temperature, short processing times, high final conductivity, versatility with different materials and surface chemistries and solvent systems, good sintering behavior including curability with heat, light, or laser at room temperature, and ability to form good and commercially useful materials from the nanoparticles.

DETAILED DESCRIPTION

Introduction

Figure 1:
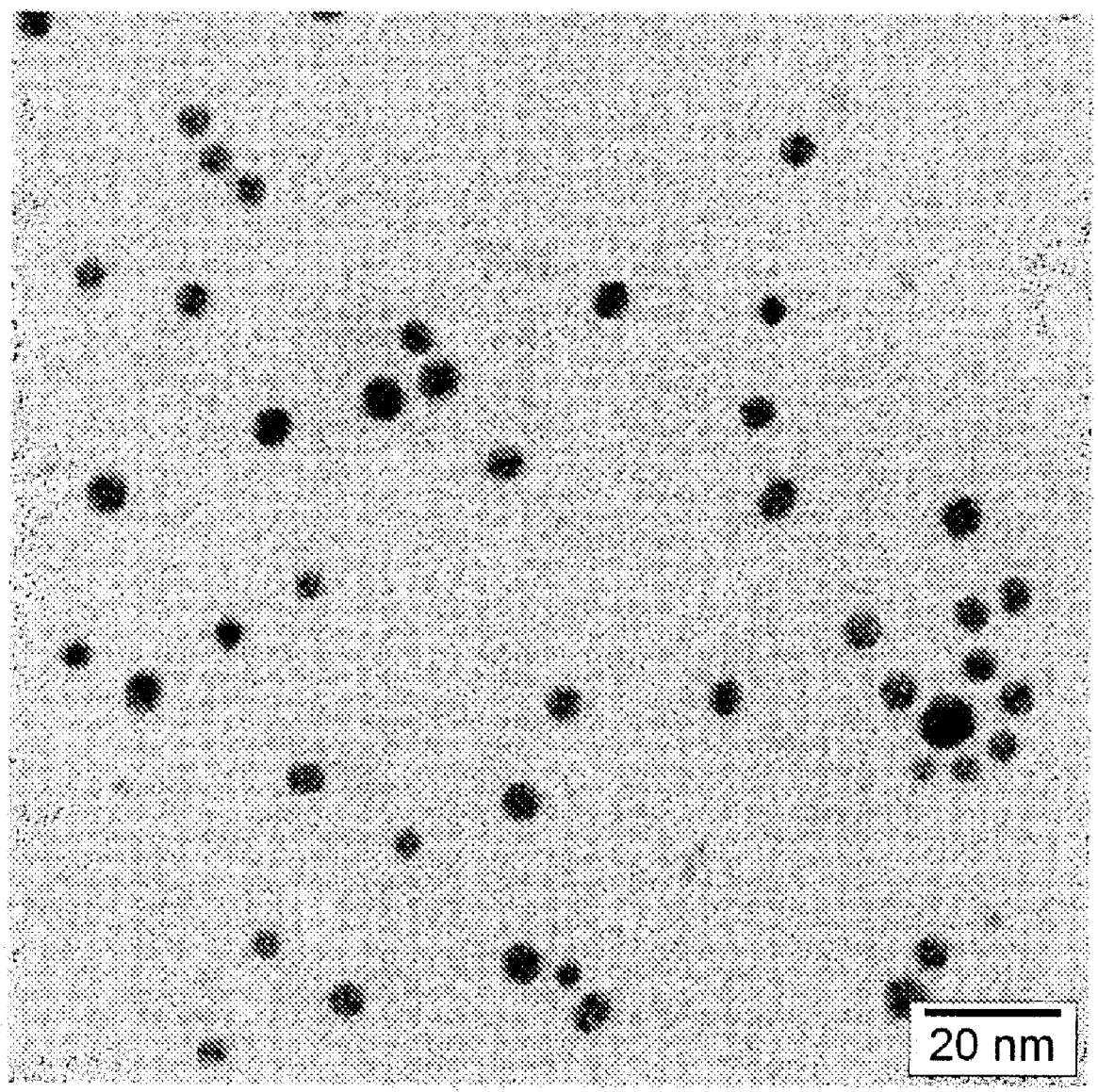
FIG. 1 is a TEM micrograph of Ag nanoparticles.

Priority U.S. provisional application Ser. No. 60/791,325 filed on Apr. 12, 2006 is hereby incorporated by reference in its entirety.

All references cited herein are hereby incorporated by reference in their entirety as if fully set forth.

Nanostructures and nanoparticles, and methods of making, characterizing, processing and using, are known in art. See for example Poole, Owens, *Introduction to Nanotechnology*, 2003, including Chapter 4; Burka et al., "Chemistry and Properties of Nanocrystals of Different Shapes," *Chem. Rev.*, 2005, 105, 1025-1102; Peng et al., "Controlled Synthesis of High Quality Semiconductor Nanocrystals," *Struc Bond*, 2005, 118: 79-119; Cozzoli et al., "Synthesis, Properties, and Perspectives of Hybrid Nanocrystal Structures," *Chem. Soc. Rev.*, 2006, 35, 1195-1208.

Further technology description for printed electronics can be found in for example *Printed Organic and Molecular Electronics*, edited by D. Gamota et al. (Kluwer, 2004).

Embodiments of the present invention describe compositions comprising inorganic nanoparticles and methods of forming the same and methods of using them.

In one aspect of the embodiments, the synthesis methods involve combining mixtures comprising nanoparticle precursors and reactive moieties, in presence of a surface stabilizing agent.

Throughout the instant disclosure, "first mixture" and "second mixture" refer to different mixtures. Likewise, "first solvent" and "second solvent" as well as "first nanoparticle precursor" and "second nanoparticle precursor" refer to different solvents and precursors respectively.

Providing Mixtures

Providing can be for example purchasing or formulating directly. One or more method steps can be used or avoided in the providing step. For example, in one embodiment, the first and second mixtures are provided without substantially use or complete total non-use of phase transfer catalyst. Phase transfer catalysts are known in the art and include for example alkylammonium salts including tetraalkylammonium salts ($R_4NX$ wherein X is an anion such as halide, chloride, bromide, or iodide), crown ethers, and cryptands, and other moieties which show host-guest properties. Avoiding this use can eliminate process steps. For example, any use of phase transfer catalyst can be less than 1 g, less than 100 mg, or less than 10 mg, see for example working examples 1 and 2 for formulations without phase transfer catalysts.

One step comprises providing a mixture, including providing a first mixture and providing a second mixture. Mixtures are generally known in the art.

Mixtures as used herein can be homogeneous or heterogeneous, although in many cases a homogeneous mixture is used. Preferably at least one mixture is a homogeneous mixture, or a highly dispersed mixture functioning as a solution, or a solution. In general, said mixtures comprise at least two components such as, for example, a precursor, a solvent, a surface stabilizing agent, and/or a reactive moiety. A mixture may comprise more than one of each. The mixtures may further comprise surfactants or emulsifiers to achieve a higher degree of homogeneity. In some embodiments two mixtures are combined to form nanoparticles. However, in other embodiments, more than two mixtures are combined to achieve the same.

The volume of the first mixture can be greater than the volume of the second mixture. For example, if the first mixture is organic, and the second mixture is aqueous, more organic mixture can be used by volume than the water mixture. The volume can be at least twice as much.

Solvents

Solvents are generally known in the art. Suitable solvents can be aqueous or organic in nature and comprise more than one component. A solvent can be adapted to dissolve or highly disperse a component such as, for example, a nanoparticle precursor, a surface stabilizing agent, or a reactive moiety. Solvents may be chosen based on the desired mixture type, solubility of solutes and/or precursors therein or other factors.

At least two solvents phase-separate after combination of the mixtures. Phase-separation may be understood as two separate liquid phases observable with the naked eye.

In the preferred embodiments, at least one solvent from a mixture (e.g. "first mixture") and a solvent from a different mixture (e.g. "second mixture") phase separate. As such, said solvents are preferably non-miscible with respect to one another. In a preferred embodiment, an organic mixture and an aqueous mixture are combined to form nanoparticles.

Water can be used in a purified form such as distilled and/or deionized water. The pH can be ordinary, ambient pH which may be somewhat acidic because of carbon dioxide. For example, pH can be about 4 to about 10, or about 5 to about 8.

In some embodiments, one or more solvents comprise saturated or unsaturated hydrocarbon compounds. Said hydrocarbon compounds may further comprise aromatic, alcohol, ester, ether, ketone, amine, amide, thiol, halogen or any combination of said moieties.

In one embodiment, the first solvent comprises an organic solvent and the second solvent comprises water. In another embodiment, the first solvent comprises a hydrocarbon and the second solvent comprises water.

Phase Separation

The first and second solvents can phase separate when they are mixed and can be immiscible as known in the art. Phase separation can be detected for example by mixing approximately equal volumes of the solvent and letting the mixture settle and then looking for an interface under normal, ambient laboratory conditions of temperature and pressure as known in the art. The solvent can be relatively pure, for example, at least about 90% pure by weight, or at least 95% pure by weight, or at least about 99% pure by weight.

Table 1 lists examples of non-miscible solvent combinations without any intent to limit the scope of solvents one may employ in practicing embodiments of the present invention.

TABLE 1

Examples of immiscible solvents which phase separate.

| SOLVENT | IMMISCIBLE IN |
|---|---|
| Acetonitrile | Cyclohexane, heptane, hexane, pentane, 2,2,4-trimethylpentane |
| carbon tetrachloride | water |
| chloroform | water |
| cyclohexane | acetonitrile, dimethyl formamide, dimethyl sulfoxide, methanol, water |
| 1,2-dichloroethane | water |
| dichloromethane | water |
| diethyl ether | dimethyl sulfoxide, water |
| dimethyl formamide | Cyclohexane, heptane, hexane, pentane, 2,2,4-trimethylpentane, water |
| dimethyl solfoxide | Cyclohexane, heptane, hexane, pentane, 2,2,4-trimethylpentane, diethyl ether |
| ethyl acetate | water |
| heptane | acetonitrile, dimethyl formamide, dimethyl sulfoxide, methanol, water |
| hexane | acetonitrile, dimethyl formamide, dimethyl sulfoxide, methanol, water |
| methanol | Cyclohexane, heptane, hexane, pentane, 2,2,4-trimethylpentane |
| methyl-tert-butyl ether | water |
| pentane | acetonitrile, dimethyl formamide, dimethyl sulfoxide, methanol, water |
| toluene | Water |
| 2,2,4-trimethylpentane | acetonitrile, dimethyl formamide, dimethyl sulfoxide, methanol, water |
| Water | carbon tetrachloride, chloroform, cyclohexane, 1,2-dichloroethane, dichloromethane, diethyl ether, dimethyl formamide, ethyl acetate, heptane, hexane, methyl-tert-butyl ether, pentane, toluene, 2,2,4-trimethylpentane |

Nanoparticle Precursors or Reactive Moieties

Nanoparticles can be made from precursors or nanoparticle precursors or reactive moieties. In many cases, only one reaction step is needed to convert the nanoparticle precursor to form the nanoparticles. In many cases, two or more, or preferably two nanoparticle precursors are reacted together to form the nanoparticle. Nanoparticle precursors as used herein include any chemical compound or reactive moiety which for example comprises covalent bonds, ionic bonds or a combination thereof. It can be any chemical compound comprising metallic atoms, semi-metallic atoms, non-metallic atoms or any combination thereof. The nanoparticle precursors chemically combine to form nanoparticles with the desired compositions.

The nanoparticle precursor can comprise a salt comprising a cation comprising a metal. The salt anion can be an inorganic anion, like a halide, or an organic anion, like a conjugate base of a carboxylic acid compound like a stearate.

In one embodiment, one or more nanoparticle precursors comprise a metal element such as a transition metal. For example one or more precursors can comprise Zn, Au, Ag, Cu Pt, Pd, Al or a combination thereof.

In one embodiment, the nanoparticle precursor comprises a metal which is not gold.

In another embodiment, one or more nanoparticle precursors comprise a semiconductor material such as a IV, I-VII, II-VI or III-V semiconductor material or a combination thereof. For example one or more precursors can comprise ZnO, ZnS, $TiO_2$, Si, Ge, CdSe, CdS, GaAs, $SnO_2$, $WO_3$, or a combination thereof.

The nanoparticle precursor can comprise a reactive moiety which is reactive to another nanoparticle precursor. For example, the reactive moiety may be free of metal, whereas the nanoparticle precursor it reacts with comprises a metal.

The reactive moiety can be for example a reducing agent. Nanoparticles may be prepared by combining reducing agents with a cationic species, such as a metal cation. Accordingly, one embodiment involves combining at least two nanoparticle precursors wherein at least one precursor provides cationic species (e.g. $Ag^+$, $Zn^{2+}$ etc.) and at least one other precursor, or reactive moiety, provides a reducing agent. Essentially any reducing agent may be used to convert the ionic species into nanoparticles. One example is a hydride compound. Non-limiting examples of reducing agents include: $NaBH_4$, $LiBH_4$, $LiAlH_4$, hydrazine, ethylene glycol, an ethylene oxide-based compound, alcohol or a combination thereof.

The reactive moiety can also comprise a hydroxy producing moiety or compound or a base such as for example sodium or potassium hydroxide.

Surface Stabilizing Agent

Surface stabilizing agents in general describe any chemical species with an affinity towards inorganic nanoparticles. Preferably, a surface stabilizing agent bonds via covalent, Van der Waals, hydrogen bonding or a combination thereof onto the surface of a nanoparticle thus forming a surface stabilizing layer. Moreover, the surface stabilizing agents also prevent the nanoparticle from growing to too large in size or from coagulating into bigger particles. Preferably, nanoparticles formed in accordance with the present embodiments are capped or coated with a layer of the stabilizing agent. In some cases it may be desirable to use more than one surface stabilizing agent.

The chemical composition of surface stabilizing agents can widely vary provided there is favorable interaction with the nanoparticles. In some examples the stabilizing agent comprises a hydrocarbon. Preferably, the hydrocarbon comprises a carbon chain with 2 to 30 carbon atoms, or with 10 to 25 carbon atoms. Said hydrocarbon may further comprise, for example, a thiol, hydroxyl, amine, or a carboxy moiety or a combination thereof. Alternatively, the stabilizing agent may be viewed as a substituted amine or a substituted carboxylic acid.

In one embodiment, the surface stabilizing agent can be represented by:

$(R)_n—X$          (I)

Wherein R can be a hydrophobic moiety, free of Lewis basicity, and X can be a hydrophilic moiety, providing Lewis basicity, and n can be for example, 1-4, or 1, 2, 3, or 4. For example, R can represent an alkyl group, linear or branched, comprising alkylene groups and a terminal methyl group. X can be an organic functional group comprising a nitrogen, oxygen, or sulfur atom. For example, R can be an alkyl group, n can be 1, and X can be —$NH_2$. Or R can be an alkyl group, n can be 1, and X can comprise —COOH or —COOR such as in a carboxylic acid or ester.

In one embodiment, the surface stabilizing agent, the first solvent, and the second solvent, are adapted so that when the first and second solvents phase separate and form an interface, the surface stabilizing agent migrates to the interface.

In one embodiment, the surface stabilizing agent comprises at least one alkylene group and a nitrogen or an oxygen atom. The alkylene group can be for example a C2 to a C30 alkylene group. It can be linear or branched.

In one embodiment, the surface stabilizing agent comprises an amino compound, or a carboxylic compound, or a thiol compound.

In one embodiment, the surface stabilizing agent comprises an amino compound, or a carboxylic compound.

The first mixture can comprises the surface stabilizing agent. The second mixture can be free of the surface stabilizing agent. Alternatively, the second mixture can comprise surface stabilizing agent.

In one embodiment, the surface stabilizing agent de-associates from the surface of the nanoparticles at a temperature of, for example, about 50° C. to about 250° C.

Combining

Combining methods are known in the art of synthesis. Combining can refer to the act of bringing two or more entities, such as mixtures, into physical contact with one another. For instance pouring two mixtures into a common volume (e.g. vat, vessel, beaker, flask, and the like) results in combination of the same. Combination of mixtures may also comprise mixing the same. Combining may also be a more controlled step done over time such as for example adding only portions, or adding drop-wise. For example, in combining, two mixtures may be placed in the same container and mechanically mixed. Agitation, stirring, injection, drop-wise addition, and the like can be used. One skilled in the art can adapt the combining methods to achieve the desired outcome for different embodiments.

In one embodiment, the combining can be carried out without external application of heat or cooling. The reaction temperature can be for example 10° C. to about 50° C., or about 20° C. or about 35° C.

Pressure and/or vacuum does not need to be applied during the combining step. Reaction pressure can be for example 700 torr to 820 torr.

Ambient temperatures and pressure of normal laboratory work and commercial production can be used.

The combination can be done batchwise, all at once, or continuously, or semicontinuously such as a drop-wise addition. For example, the second mixture can be added continuously or semi-continuously to the first mixture.

Nanoparticles

Nanoparticles can be collected, isolated, or purified from the zone where combining is done. For example, separation of phases can be carried out. Solvent can be removed. Particles can be precipitated and washed.

The yield of the collected nanoparticles, based on weight, can be for example at least 50%, or at least 70%, or at least 90% or at least about 95%, or at least about 98%.

The shape of the nanoparticle is not particularly limited but can be for example approximately spherical, or non-spherical, or elongated, having an aspect ratio for example. For example, aspect ratio can be at least 1.5:1, or at least 2:1, or at least 3:1, and with higher aspect rations, rod, wire, and needle structures can form. In some embodiments, these elongated structures can be relatively small portions of the product, e.g., less than 30% by weight, or less than 20% by weight, or less than 10% by weight.

Without wishing to be bound by theory, separation of the precursor materials in the immiscible solvents is believed to effectively control the reaction speed for forming inorganic nanoparticles by limiting or substantially limiting the contact of the nanoparticle precursors and reactive moieties to the interface region of the immiscible solvents. Therefore, the formation and growth rates of the inorganic nanoparticles can be limited by the amount of nanoparticle precursor species that have diffused from the bulk of solvents to interfaces of immiscible solvents.

Reaction between the nanoparticle precursors can result in formation of the nanoparticles, with a surface stabilizing agent(s) adsorbed thereon or otherwise providing dispersability. Due to the immiscibility of the solvents, the reactions between precursor materials and reactive moieties can be focused, exclusively or non-exclusively, at the interface of solvents. Furthermore, the surface stabilizing agents present at the interface, maintain the average nanoparticle size to a limited range generally between about 1 to about 1000 nm, preferably between about 1 nm and about 100 nm, more preferably between about 1 nm and about 20 nm and most preferably between about 2 nm and about 10 nm.

As used herein, nanoparticle and nanoparticles denote particles with a diameter of between about 1000 nm and about 1 nm. In embodiments of the present invention, the nanoparticles formed can be a function of solvents, chemical composition and concentration of precursor materials, the chemical composition and concentration of surface stabilization agents, processing procedure, temperature, any combination thereof in addition to other factors. Therefore, the size of nanoparticle synthesized in accordance with the embodiments of the present invention are well controlled in the range from 1 to 1000 nm, preferably from 1 to 100 nm, more preferably from 1 to 20 nm, most preferably from 2 to 10 nm, with very narrow particle size distribution.

Particle size can be measured by methods known in the art including for example TEM or SEM and can be adapted for the size of the particle. For roughly spherical particles, particle size can approximate the diameter of a sphere. Particle size can be measured to not include the layer of stabilizing agent which can be removed from the nanoparticle. The thickness of the stabilizing layer is usually thin and less than the diameter of the nanoparticle.

Monodispersity can be measured by particle counting methods and can show a size distribution with the standard deviation of, for example, about 3 nm or less, or about 2 nm or less. For example, metal and silver nanoparticles can show an average particle size of 5.4 nm with standard deviation of 1.4 nm, or about 26% by measuring the size of about for example 750 nanoparticles from about 20 TEM micrographs. An example of the TEM micrographs is shown as FIG. 1.

Figure 2:
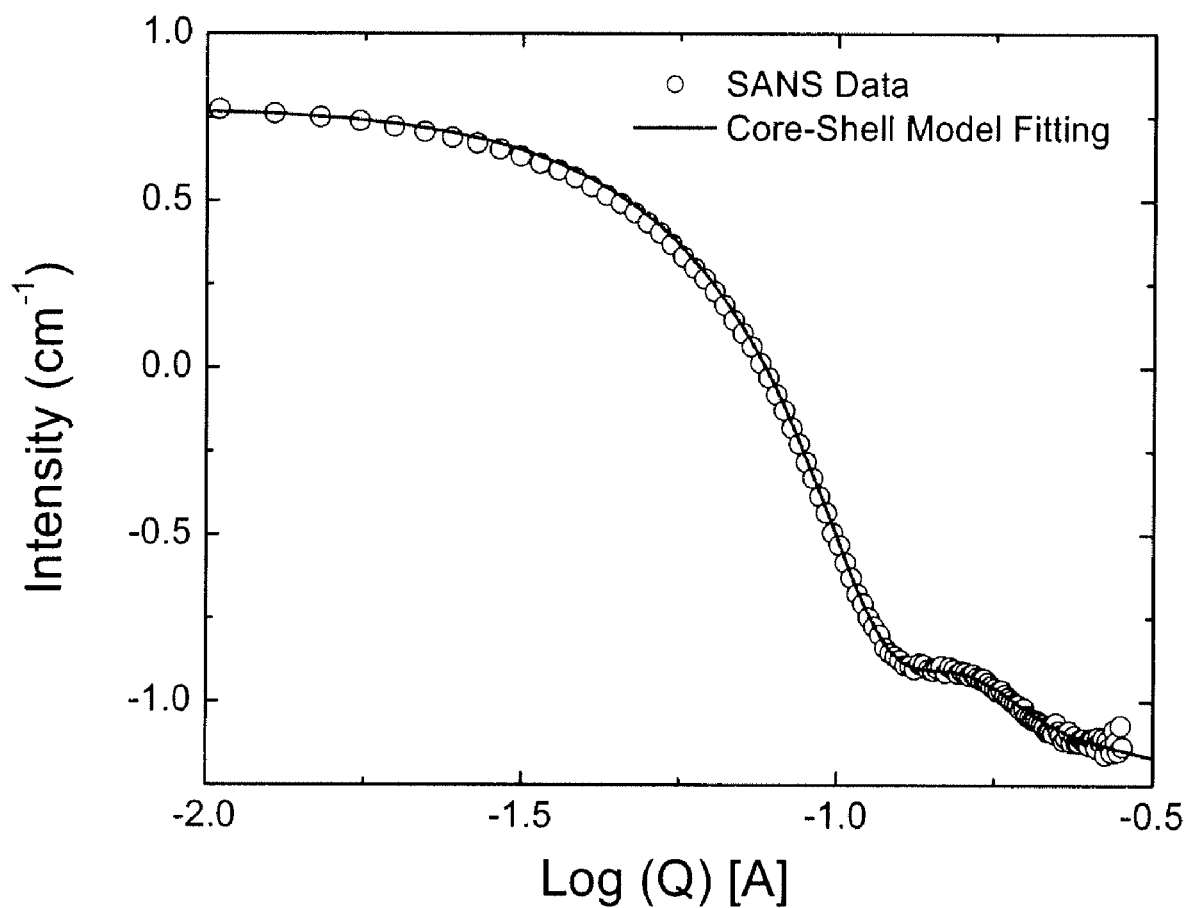
FIG. 2 is SANS data for Ag nanoparticles.

To more accurately determine the ensemble-averaged nanoparticle size and size distribution, the technique of Small Angle Neutron Scattering (SANS) can be also applied. For example, a beam of cold neutrons with a wavelength of 6 Angstrom can be directed to a solution of 10 wt % nanoparticles, e.g., Ag nanoparticles, in deuterated toluene, and the intensity of scattered neutrons can be recorded as a function of the scattering angle, which is further converted to the absolution scattering cross-section as a function of neutron momentum transfer vector, as shown in FIG. 2. The deuteration of the solvent helps ensure sufficient scattering length density contrasts among the nanoparticle (e.g., Ag), the surface stabilizing agent, and the solvent, allowing for SANS recording structural information of both nanoparticle core (e.g., Ag) and the organic shell. Subsequent SANS data evaluation using a core-shell model and the Shultz distribution function (the solid line through the symbols as the best fit) reveals an average diameter of 4.6 nm for, for example, the Ag core and thickness of 0.6 nm for the organic shell in toluene. Furthermore, the standard deviation of the, for example, Ag nanoparticle diameter is 1.1 nm, or about 24%. The SANS results are consistent with but even more assuring than the TEM micrographs since they average over a macroscopic sample volume.

One embodiment provides that the nanoparticles comprise Ag, Cu, Pt, Pd, Al, Sn, In, Bi, ZnS, ITO, Si, Ge, CdSe, GaAs, $SnO_2$, $WO_3$, SnS:Mn, ZnS:Tb, SrS, SrS:Cs, $BaAl_2S_4$, $BaAl_2S_4$:EU, or combinations thereof.

Exclusions

Basic and novel embodiments include formulations to exclude or substantially exclude components and method steps which are not advantageous to a desired outcome. For example, they may generate impurities or may be economically inefficient for commercialization.

For example, one embodiment provides that the first mixture is provided without use of a phase transfer catalyst.

In another embodiment, the salt anion is free of metal.

In another embodiment, the surface stabilizing agent consists essentially of at least substituted amine or substituted carboxylic acid, wherein the substituted group comprise two to thirty carbon atoms, and not sulfur is not present.

In another embodiment, the surface stabilizing agent consists essentially of an amino compound, or a carboxylic acid compound, and sulfur is not present.

In another embodiment, the first mixture consists essentially of the surface stabilizing agent, and the second mixture is free of surface stabilizing agent.

In another embodiment, the combination is carried out without external application of heat or cooling.

In another embodiment, the combination is carried out without application of pressure or vacuum.

In another embodiment, the first mixture and the second mixture are free of compounds which can react with each other to form sulfide compounds.

In another embodiment, the methods exclude complex processing steps found in prior art such as for example vacuum deposition and aerosols.

Ink Formulation

Inks can be formulation from the nanoparticles. For example, one embodiment provides a composition comprising: nanoparticles comprising an amine or carboxylic acid surface stabilizing agent dispersed in at least one solvent, wherein the concentration of the nanoparticles is about 1 wt. % to about 70 wt. %, or about 5 wt. % to about 40 wt. %, and the nanoparticles have an average size of about 1 nm to about 20 nm, or about 2 nm to about 10 nm, and a monodispersity of about 3 nm or less, or about 2 nm or less.

In one embodiment, the concentration is about 10 wt. % to about 50 wt. %.

In one embodiment, the solvent is an organic solvent such as a hydrocarbon like cyclohexane Inks can be formulated with the film or pattern formation methods in minds such as for example ink jet printing or spin coating. Solution stability and shelf life can be tailored.

Other ingredients can be added to the inks such as for example dyes, anti-oxidants, viscosity modifiers, and surface adhesion promoters.

Figure 3:
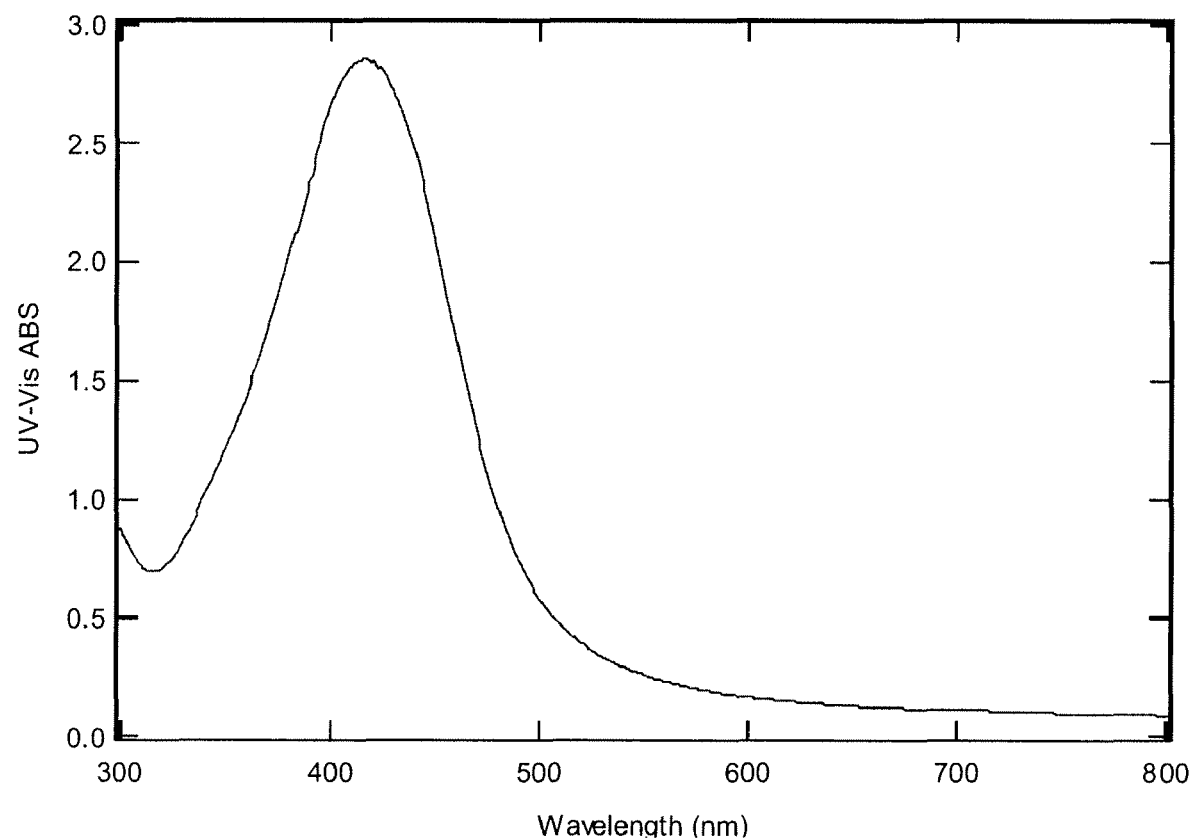
FIG. 3 is UV-VIS data for Ag nanoparticles.

UV-VIS characterization can be carried out and may show for example a sharp absorption spectrum peak at around for example 400-450 nm, in for example silver nanoparticle dispersed in for example cyclohexane. The absorption peak may be relatively sharp and begin at about 325 nm and end at about 500 nm, as shown in FIG. 3.

Film Formation and Patterning

Methods known in the art can be used to convert nanoparticles and inks to solid state films and coatings and layers, whether patterned or not. Thickness of films can be for example about one micron or less, or about 500 nm or less, or about 1 nm to about 1,000 nm, or about 10 nm to about 750 nm.

Printing methods can be used to print onto paper, plastic, and textiles. Common press equipment can be used including for example screen printing, flexography, gravure, and offset lithography. Direct write methods can be used. Ink jet printing can be used including drop-on-demand ink jet printing.

The surface stabilizing material can be driven off by heat or light cure, e.g, laser or UV light at room temperature. Sintering and annealing can be carried out.

Films can be characterized by electrical performance including conductivity and resistivity.

Conductivity can be at least $10^4$ S/cm. Resistivity can be smaller than $10^{-4}$ ohm/cm. Resistivity can be found to be only four times or less, or three times or less, or two times or less, or 1.5 times or less, of the pure metal.

Film substrates are known in the art including for example flexible materials including plastics and composites which may optionally be coated before the nanoparticles are applied. Plastics include synthetic polymers like PET and high temperature polymers including for example polyimide.

Nanoparticle Melting Properties

Nanoparticles can be made which have surface melting temperatures lower than the melting temperature of the bulk material. For example, the surface melting temperature can be from 50° C. to about 200° C., or about 75° C. to about 175° C., or about 90° C. to about 160° C.

Figure 4:
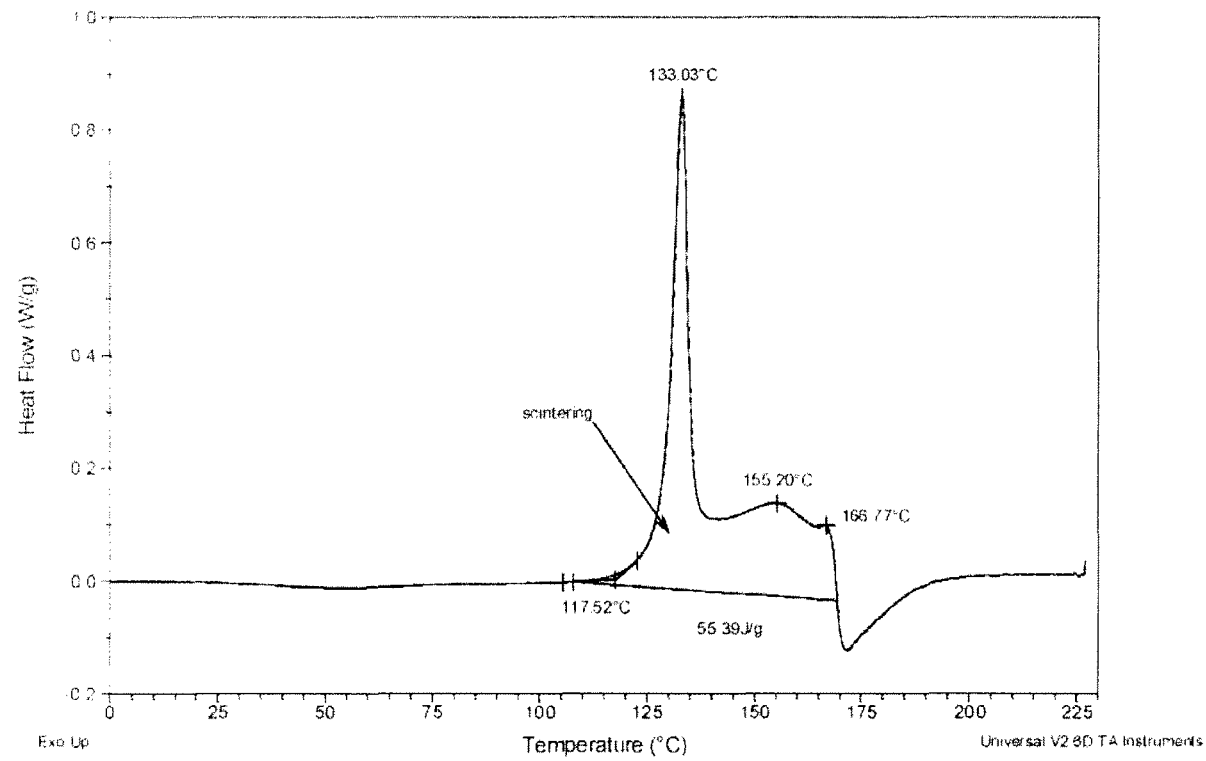
FIG. 4 illustrates a DSC for Ag nanoparticles.

Melting temperature can be measured by for example DSC methods as shown in FIG. 4.

Nanoparticle Sintering Properties

In a most preferred embodiment of the invention the conductive nanoparticles that sinter at low temperatures to form electrically conductive materials on a substrate have the particle sizes from about 2 nm to about 10 nm. It has been demonstrated in the examples below that the silver and gold nanoparticles with the sizes from about 2 nm to about 10 nm can be sintered at temperatures below 200° C. to form highly conductive materials on the substrates. The treatment temperatures are far below the melting temperatures of silver and gold. The conductivities of metal films after the nanoparticle sintering are almost as high as the metal films processed by CVD. This process can be generally applied to conductive inorganic nanoparticles including, but not limited to, Ag, Au, Cu, Pt, Pd, Al, Sn, In, Bi, ZnS and ITO.

Sintering may be seen as an exotherm in DSC (FIG. 4) at between about 110° C. and about 160° C., or about 120° C. and about 140° C. An exothermic peak can be observed.

Figure 5:
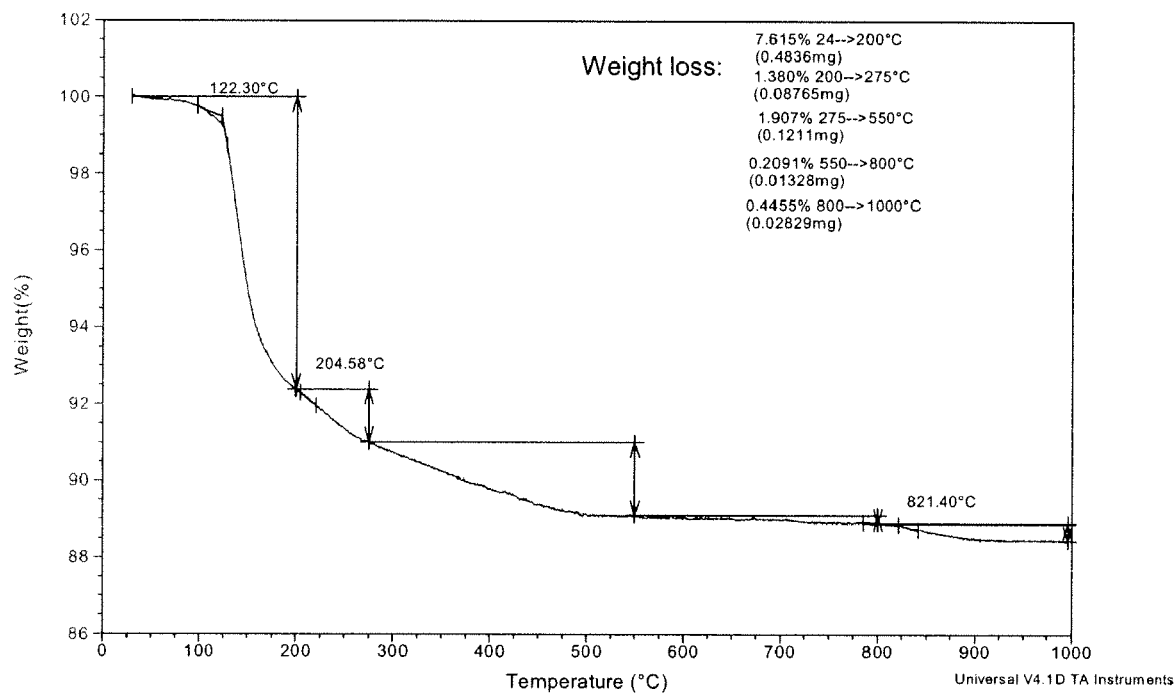
FIG. 5 is a thermal gravimetric analysis (TGA) for Ag nanoparticles.

TGA analysis (FIG. 5) may show for example weight loss around 100° C. to about 200° C. due to loss of surface stabilizing agent.

General Example of Metal (Silver) Nanoparticle Formation

Figure 6:
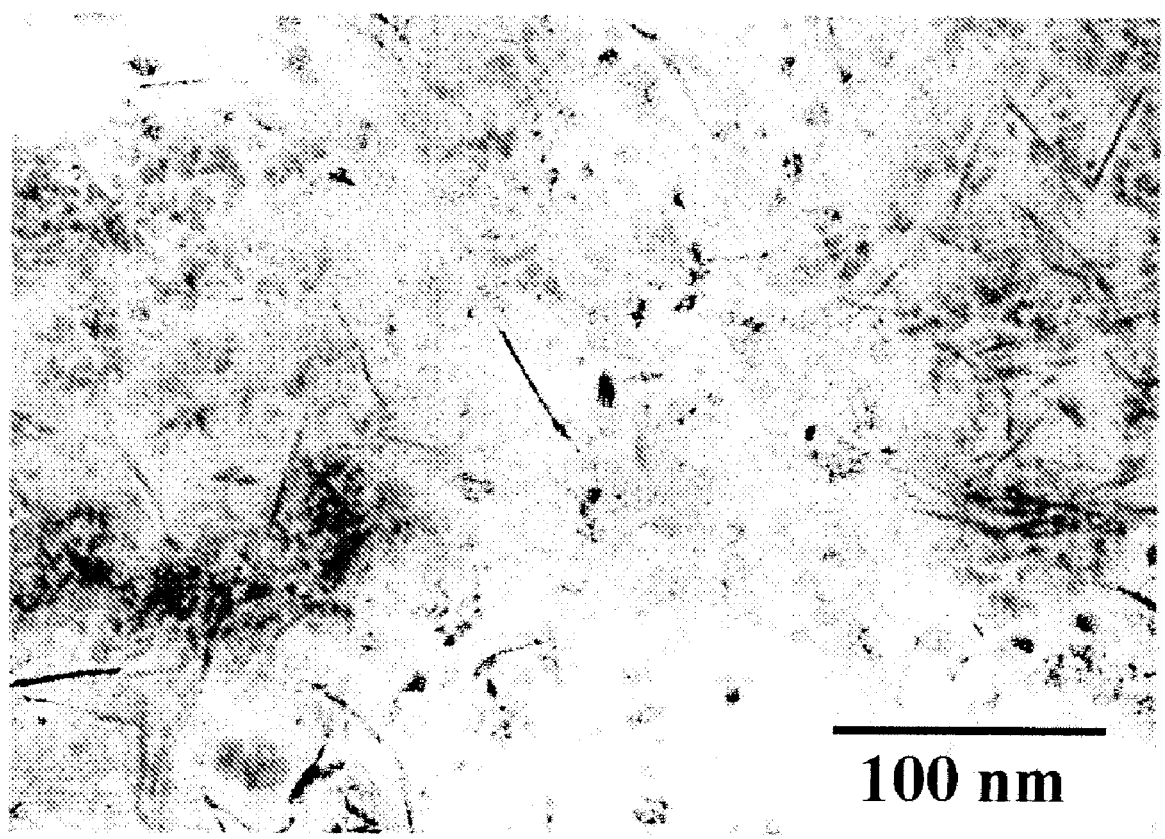
FIG. 6 is a TEM micrograph of ZnO nanoparticles.

One example of the electrically conductive nanoparticles is silver nanoparticles. In this example, one precursor material is a silver ion containing agent, such as silver acetate, which is dissolved in a first solvent such as toluene, and another precursor material is a reduction agent such as sodium borohydrite, NaBH4, which is dissolved in a second solvent immiscible with the first solvent such as water. There are other reduction agents such as LiBH4, LiAlH4, hydrazine, ethylene glycol, ethylene oxide based chemicals, and alcohols, etc. These precursor materials in the immiscible solvents are mechanically mixed with the presence of a surface stabilizing agent for the silver nanoparticles. The surface stabilizing agents could be a substituted amine or a substituted carboxylic acid with the substituted groups having 2 to 30 carbons. The surface stabilizing agent capped silver nanoparticles, with size ranging from 1 to 1000 nm, preferably from 1 to 100 nm, more preferably from 1 to 20 nm, most preferably from 2 to 10 nm, are produced. A TEM micrograph of silver nanoparticles synthesized with this method is shown in FIG. 6.

The nanoparticles formed in accordance with this method exhibit special properties due to their relatively high monodispersity in diameter, namely between about 1 nm and about 20 nm. For example, the Ag nanoparticle melting temperature is significantly reduced from its bulk melting temperature of 962° C. to lower than 200° C. This property will allow nanoparticles to form electrically conductive patterns or tracks on a substrate when processed at a temperature lower than 200° C. These materials are found to have wide applications in fabricating printed electronic devices on substrates. Other examples of nanoparticles of electrically conductive materials include, but not limited to, Au, Cu, Pt, Pd, Al, Sn, In, Bi, ZnS and ITO.

General Example of Semiconductor (Zinc Oxide) Nanoparticle Formation

In another preferred embodiment of the invention, nanoparticles of semi-conductive materials are synthesized. One example of the semi-conducting nanoparticles is zinc oxide nanoparticles. In this example, one precursor material is a zinc ion containing agent, such as zinc stearate, which is dissolved in a first solvent such as toluene, and another precursor material is a hydroxyl producing agent such as sodium hydroxide which is dissolved in a second solvent immiscible with the first solvent such as water. By mechanically mixing these precursor materials in the immiscible solvents with the presence of a surface stabilizing agent for zinc oxide nanoparticles such as a substituted amine or a substituted carboxylic acid, the surface capped zinc oxide nanoparticles, with size ranging from 1 to 1000 nm, preferably from 1 to 100 nm, more preferably from 1 to 20 nm, most preferably from 2 to 10 nm, are produced. A TEM micrograph of ZnO nanoparticles synthesized with this method is shown in FIG. 6.

The nanoparticles produced with the method disclosed in this invention exhibit special properties due to their discrete size of dimensions in nanometers, particularly in 1 to 20 nm in dimensions. For example, the zinc oxide nanoparticle sintering temperature is significantly reduced from its bulk melting temperature of 1975° C. to lower than 400° C. This property will allow the nanoparticles to form semi-conducting films or devices on a substrate when processed at a temperature lower than 400° C. Other examples of nanoparticles of semi-conductive materials include, but not limited to, Si, Ge, CdSe, and GaAs.

In another preferred embodiment of the invention, nanoparticles of electroluminescent materials are synthesized with the method of this invention. Examples of nanoparticles of electroluminescent materials include, but not limited to, ZnS, ZnS:Mn, ZnS:Tb, SrS, SrS:Cs, $BaAl_2S_4$, and $BaAl_2S_4$:Eu.

The low temperature sintering processes of nanoparticles synthesized with the method of this invention also exhibit unique thermal properties. This feature distinguishes the nanoparticle sintering processes from the conventional bulk material melting processes. The conventional bulk melting processes normally exhibit an endothermic thermal process during the material phase transition.

Therefore, disclosed herein is a general method of synthesizing inorganic nanoparticles, with the size ranging from 1 to 1000 nm, preferably from 1 to 100 nm, more preferably from 1 to 20 nm, of desired materials properties. The method involves a multiphase-solution-based reaction wherein the system comprises at least two precursor materials and at least one surface stabilizing agent. This method presents advantages over other methods in the field due to its simplicity, controllability, and scalability. The inorganic nanoparticles synthesized with the method of this invention can be sintered to electrically functional materials at the temperature far below the melting temperature of the bulk materials, preferably less than 250 C. The electrically functional materials sintered from the inorganic nanoparticles synthesized with the method of this invention demonstrated superior properties and performance as a class of printable materials using for fabricating printed electronics devices.

Applications

The nanoparticles can be formed into a film having a desired property due to the material in the nanoparticles, although if desired other materials can be added and used with the nanoparticles. For example, the nanoparticles can be formed into a film having electrical conductivity due to the material in the nanoparticles, or the nanoparticles can be formed into a semiconductive film, in a doped or undoped state, having semiconductivity due to the material in the nanoparticles, in a doped or undoped state, or the nanoparticles can be formed into an electroluminescent film having electroluminescence due to the material in the nanoparticles.

Applications for the nanoparticles are diverse and can range from biotechnology, nanomedicine, diagnostics, printed electronics, displays, OLEDs, PLEDs, SMOLEDs, transistors, thin film transistors, field effect transistors, solar cells, sensors, biosensors, medical diagnostics, nanocomposites, and the like. In particular, these materials can be used in fabricating printed semi-conducting devices such as TFTs and TFDs on substrates. Additional examples include flexible and flat panel displays, RFID antenna and integrated circuits, printed circuit boards (PCB), reflective mirrors and metallic coatings, flexible digital watches, electronic paper, active matrix displays, touch screens, EMI shielding, and printable solar cells.

Applications amenable to reel-to-reel fabrication are particularly of importance. These applications would not involve lithography, vacuum processing, reduced abatement costs, cheap substrate handling, and reduced packaging costs. Inkjet printing and gravure printing can be used.

Various embodiments are further described with use of the following non-limiting working examples.

WORKING EXAMPLES

Example 1

Synthesis of Ag Nanoparticles 3.34 grams of silver acetate and 37.1 grams of Dodecylamine were dissolved in 400 ml of toluene. 1.51 grams of sodium borohydride ($NaBH_4$) was dissolved in 150 ml of water. The $NaBH_4$ solution was added drop-wise into the reaction flask through a dropping funnel over a period of 5 min while stirring. Keep stirring for the reaction of 2.5 hours and stop. The solution settled into two phases. Remove water phase by a separation funnel, and then use a rotor evaporator to remove toluene from the solution, resulting in a highly viscous paste. 250 ml of 50/50 methanol/acetone was added to precipitate the Ag nanoparticles. The solution was filtrated through a fine sintered glass funnel and the solid product was collected and vacuum dried at room temperature. 2.3 to 2.5 grams of deep blue solid product were obtained. The nanoparticles have the size of 4-5 nm examined by TEM (FIG. 1), and have shown the sintering or particle fusion temperature of 100-160 C examined by DSC (FIG. 4). It was also shown by Small Angle Neutron Scattering experiments that the silver nanoparticles have the size of 4.6+/−1 nm.

Example 2

Synthesis of Zinc Oxide Nanoparticles 6.3 grams of zinc stearate [$Zn(C_{18}H_{35}O_2)_2$] and 10 grams of Hexadecylamine were dissolved in 400 ml of toluene. 1.2 grams of potassium hydroxide (KOH) was dissolved in 150 ml of water. The KOH solution was added drop-wise into the reaction flask through a dropping funnel over a period of 5 min while stirring. Keep stirring for the reaction of 2 hours and stop. Remove water phase by a separation funnel, and then use a rotor evaporator to remove toluene from the solution. 250 ml of 50/50 methanol/acetone was added to precipitate the zinc oxide nanoparticles. The solution was filtrated through a fine sintered glass funnel and the solid product was collected and vacuum dried at room temperature. About 0.8 grams of white solid product were obtained. The nanoparticles have the size of about 7.4 nm (with a small fraction of ZnO nano-needles presence) examined by TEM (FIG. 6).

Example 3

Coated Conductive Films from Sintered Silver Nanoparticles

Solutions ranging from 10% to 20% wt. of Ag nanoparticles synthesized in Example 1 in cyclohexane were prepared and spin-coated on cleaned glass substrates at about 1500 rpm, resulting in the nanoparticle coated films with the thickness ranging from 0.1 to 0.3 microns. The nanoparticle thin films were heated to the temperatures ranging from 90° C. to 180° C. for 10 mins, while the color of the thin films changed from dark brown to light silver. The conductive of the sintered silver films was measured by a Four-Point Probe instrument. The results are listed in Table 2. It's demonstrated that the sintered thin films have excellent conductivities reaching about 70% of pure silver with sintering temperature above 150° C.

TABLE 2

| Anneal Temperature (C.) | Resistivity (ohm-cm) |
| --- | --- |
| 90 | $1.86 \times 10^{-5}$ |
| 120 | $8.8 \times 10^{-6}$ |
| 150 | $2.4 \times 10^{-6}$ |
| 180 | $2.3 \times 10^{-6}$ |

Example 4

Morphology

Figure 7:
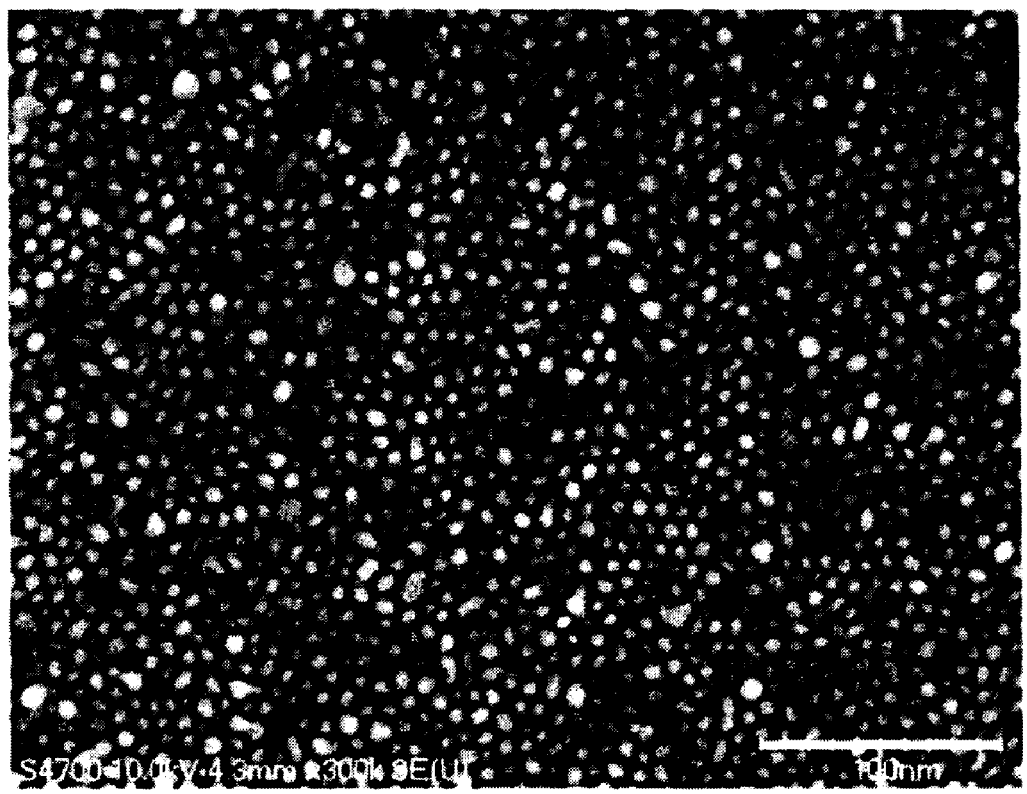
FIG. 7(a) is an SEM micrograph of the silver nanoparticles, with a diameter of about 5 nm, cast on an aluminum substrate.
FIG. 7(b) is an SEM micrograph a silver film on a PET plastic substrate from silver nanoparticles cast on the substrate and annealed at the temperature of about 150° C.
Figure 7:

Morphology of deposited nanoparticles and sintered films are shown in FIG. 7(a) SEM micrograph of the silver nanoparticles with particle of about 5 nm in size synthesized with the methods of the claimed invention (the nanoparticles was cast on an aluminum substrate), and FIG. 7(b) SEM micrograph of the silver film on a PET plastic substrate where the same nanoparticles was cast on and annealed at the temperature of about 150° C. It is shown that the nanoparticles have sintered or fused to a condensed metal film activated by a treatment temperature far less than the melting temperature of the material.

Example 5

DSC

In the low temperature sintering processes of nanoparticles synthesized with the method of the claimed invention, an exothermic thermal process was detected by DSC, differential scanning calorimetry. The DSC thermal analysis of the sample was performed with a TA Q200 from TA Instruments (New Castle, Del.). A sample of about 10 mg of nanoparticles was loaded with a non-hermetic sample pan. As shown in FIG. 4, a DSC thermal analysis curve obtained with a sample of the silver nanoparticles synthesized with the method of this invention with the particle size of about 5 nm, the unique exothermic processes (peaked at 133° C.) demonstrated as the temperature was raised to 110° C. to 160° C., which is also associated with the nanoparticle sintering. The exothermic transition temperatures shown by DSC also help to determine the optimal treatment temperature for sintering the nanoparticles. As comparison, a silver nanoparticle sample purchased from NanoDynamics (NDSilver S2-80, Buffalo, N.Y.) with the particle size of about 60 nm does not have the exothermic process shown in the temperatures below 350° C. (Figure not shown). In another preferred embodiment of the invention, the inorganic nanoparticles synthesized with the method of this invention exhibit an exothermic sintering process at the temperatures less than 250° C.

What is claimed is:

1. A method comprising:
    (a) providing a first solution mixture comprising at least one nanoparticle precursor and at least one first solvent for the nanoparticle precursor, wherein the nanoparticle precursor comprises a salt comprising a cation comprising a metal;
    (b) providing a second solution mixture comprising at least one reactive moiety reactive for the nanoparticle precursor and at least one second solvent for the reactive moiety, wherein the second solvent phase separates when it is mixed with the first solvent; and
    (c) combining said first and second solution mixtures in the presence of a surface stabilizing agent, wherein upon combination the first and second solution mixtures phase-separate and nanoparticles having a surface stabilizing layer disposed thereon are formed, and
    further comprising the step of collecting the nanoparticles, wherein the collected nanoparticles have an average particle size of about 1 nm to about 100 nm, and wherein a thickness of the surface stabilizing layer disposed on the nanoparticles is less than a diameter of the nanoparticles.

2. The method according to claim 1, wherein the first solvent comprises an organic solvent, and the second solvent comprises water.

3. The method according to claim 1, wherein the first solvent comprises a hydrocarbon solvent, and the second solvent comprises water.

4. The method according to claim 1, wherein the metal comprises a transition metal.

5. The method according to claim 1, wherein the reactive moiety comprises a reducing agent.

6. The method according to claim 1, wherein the reactive moiety comprises a hydride.

7. The method according to claim 1, wherein the reactive moiety comprises a hydroxyl producing agent.

8. The method according to claim 1, wherein the surface stabilizing agent, the first solvent, and the second solvent, are adapted so that when the first and second solvents phase separate and form an interface, the surface stabilizing agent migrates to the interface.

9. The method according to claim 1, wherein the surface stabilizing agent comprises at least one alkylene group and a nitrogen atom or an oxygen atom.

10. The method according to claim 1, wherein the surface stabilizing agent comprises at least substituted amine or substituted carboxylic acid, wherein the substituted group comprises two to thirty carbon atoms.

11. The method according to claim 1, wherein the surface stabilizing agent comprises an amino compound, a carboxylic acid compound, or a thiol compound.

12. The method according to claim 1, wherein the surface stabilizing agent comprises an amino compound, or a carboxylic acid compound.

13. The method according to claim 1, wherein the first mixture comprises the surface stabilizing agent.

14. The method according to claim 1, wherein the first mixture comprises the surface stabilizing agent, and the second mixture is free of surface stabilizing agent.

15. The method according to claim 1, wherein the phase-separation produces an interface and the nanoparticles form at the interface.

16. The method according to claim 1, wherein the collected nanoparticles have an average particle size of about 1 nm to about 20 nm.

17. The method according to claim 1, further comprising the step of collecting the nanoparticles, wherein the collected nanoparticles have an average particle size of about 2 nm to about 10 nm, and the nanoparticles have a monodispersity showing standard deviation of 3 nm or less.

18. The method according to claim 1, wherein the nanoparticles can be formed into a film having electrical conductivity due to the material in the nanoparticles, or wherein the nanoparticles can be formed into a semiconductive film having semiconductivity due to the material in the nanoparticles, or wherein the nanoparticles can be formed into an electroluminescent film having electroluminescence due to the material in the nanoparticles.

19. The method according to claim 1, wherein the volume of the first mixture is greater than the volume of the second mixture.

20. The method according to claim 1, wherein the combination is carried out without external application of heat or cooling.

21. A method comprising:
    (a) providing a first solution mixture comprising at least one nanoparticle precursor and at least one first solvent for the nanoparticle precursor, wherein the nanoparticle precursor comprises a salt comprising an inorganic cation;
    (b) providing a second solution mixture comprising at least one reactive moiety reactive for the nanoparticle precursor and at least one second solvent for the reactive moiety, wherein the second solvent phase separates when it is mixed with the first solvent; and
    (c) combining said first and second solution mixtures in the presence of a surface stabilizing agent, wherein upon combination the first and second solution mixtures phase-separate and nanoparticles having a surface stabilizing layer disposed thereon are formed, and
    further comprising the step of collecting the nanoparticles, wherein the collected nanoparticles have an average particle size of about 1 nm to about 100 nm wherein a thickness of the surface stabilizing layer disposed on the nanoparticles is less than a diameter of the nanoparticles.

22. A method according to claim 21, wherein the first solvent comprises an organic solvent, and the second solvent comprises water.

23. The method according to claim 21, wherein the salt comprises an organic anion.

24. The method according to claim 21, wherein first mixture comprises the surface stabilizing agent.

25. The method according to claim 21, wherein the combining is done without application of pressure or vacuum, or the external application of heat or cooling.

26. The method according to claim 21, wherein the second mixture is added continuously or semi-continuously to the first mixture.

27. The method according to claim 21, further comprising the step of collecting the nanoparticles in at least 50% yield.

28. The method according to claim 21, wherein the surface stabilizing agent is represented by:

$(R)_n X$ wherein R is an alkyl group, n is from one to four, and X is a functional group which provides Lewis base properties.

29. The method according to claim 21, wherein the inorganic cation comprises silver, the reactive moiety is a hydride, the first solvent is an organic solvent, the second solvent is water, and the surface stabilizing agent is an amine compound.

30. The method according to claim 21, wherein the inorganic cation comprises zinc, the reactive moiety is a hydroxyl producing moiety, the first solvent is an organic solvent, the second solvent is water, and the surface stabilizing agent is an amine compound.

31. A method comprising:
(a) providing a first solution mixture comprising at least one nanoparticle precursor comprising a metal and at least one first solvent;
(b) providing a second solution mixture comprising at least one moiety reactive with the nanoparticle precursor and at least one second solvent, wherein the second solvent phase separates when it is mixed with the first solvent; wherein the first and second mixtures are provided without substantially use of phase transfer catalyst; and
(c) combining said first and second solution mixtures in the presence of a surface stabilizing agent, wherein the first and second solution mixtures phase-separate and nanoparticles having a surface stabilizing layer disposed thereon are formed, and
further comprising the step of collecting the nanoparticles, wherein the collected nanoparticles have an average particle size of about 1 nm to about 100 nm wherein a thickness of the surface stabilizing layer disposed on the nanoparticles is less than a diameter of the nanoparticles.

32. The method according to claim 31, wherein the first and second mixtures are provided without any use of phase transfer catalyst.

33. The method according to claim 31, wherein the phase transfer catalyst is a tetraalkylammonium salt.

34. The method according to claim 31, wherein the first and second mixtures are provided without any use of phase transfer catalyst, and wherein the phase transfer catalyst is a tetraalkylammonium salt.

35. The method according to claim 31, wherein the nanoparticle precursor is dissolved in the first solvent without any use of phase transfer catalyst.

36. The method according to claim 31, wherein the first solvent is an organic solvent, and the second solvent is water.

37. The method according to claim 31, wherein the first solvent is an organic hydrocarbon solvent, and the second solvent is water.

38. The method according to claim 31, wherein the nanoparticle precursor does not comprise gold.

39. The method according to claim 31, wherein the surface stabilizing agent does not comprise a thiol.

40. The method according to claim 31, wherein the nanoparticle precursor does not comprise gold, and wherein the surface stabilizing agent does not comprise a thiol.

41. A method comprising:
(a) providing a first solution mixture comprising at least one nanoparticle precursor and at least one first solvent,
(b) providing a second solution mixture comprising at least one moiety reactive with the nanoparticle precursor and at least one second solvent, wherein the second solvent phase separates when it is mixed with the first solvent; and
(c) combining said first and second solution mixtures in the presence of a surface stabilizing agent comprising an amino group or a carboxylic acid group, wherein the first and second solution mixtures phase-separate and form nanoparticles having a surface stabilizing layer disposed thereon, and
further comprising the step of collecting the nanoparticles, wherein the collected nanoparticles have an average particle size of about 1 nm to about 100 nm wherein a thickness of the surface stabilizing layer disposed on the nanoparticles is less than a diameter of the nanoparticles.

42. The method according to claim 41, wherein the surface stabilizing agent does not comprise sulfur.

43. The method according to claim 41, wherein the surface stabilizing agent comprises a C2-C30 substituent bonded to an amino or carboxylic acid group.

44. The method according to claim 41, wherein the surface stabilizing agent comprises an amino group.

45. The method according to claim 41, wherein the surface stabilizing agent comprises a primary amine.

46. The method according to claim 41, wherein the surface stabilizing agent comprises an alkyl amine.

47. The method according to claim 41, wherein the surface stabilizing agent comprises a carboxylic acid group.

48. The method according to claim 41, wherein the surface stabilizing agent comprises a carboxylic acid group linked to an alkyl group.

49. The method according to claim 41, wherein the first solvent is an organic solvent and the second solvent is water.

50. The method according to claim 41, wherein the first solvent is an organic solvent, the nanoparticle precursor is soluble in the organic solvent, and the first mixture is provided without use of phase transfer catalyst.

51. A method comprising:
(a) providing a first solution mixture comprising at least one first solvent and at least one nanoparticle precursor, wherein the nanoparticle precursor comprises a metal which is not gold;
(b) providing a second solution mixture comprising at least one second solvent and at least one reactive moiety reactive with the nanoparticle precursor, wherein the second solvent phase separates when it is mixed with the first solvent; and
(c) combining said first and second solution mixtures in the presence of a surface stabilizing agent, wherein the first and second solution mixtures phase-separate, and form nanoparticles having a surface stabilizing layer disposed thereon, and further comprising the step of collecting the nanoparticles, wherein the collected nanoparticles have an average particle size of about 1 nm to about 100 nm wherein a thickness of the surface stabilizing layer disposed on the nanoparticles is less than a diameter of the nanoparticles.

52. The method according to claim 51, wherein the first solvent is an organic solvent, and the second solvent is water.

53. The method according to claim 51, wherein the providing the first mixture is done without substantial use of phase transfer catalyst.

54. The method according to claim 51, wherein the nanoparticle precursor comprises a salt, and the salt cation comprises a metal.

55. The method according to claim 51, wherein the surface stabilizing agent comprises an amino compound or a carboxylic acid compound.

56. A method comprising:
(a) providing a first solution mixture comprising at least one first solvent and at least one nanoparticle precursor, wherein the nanoparticle precursor comprises a metal;
(b) providing a second solution mixture comprising at least one second solvent and at least one reactive moiety reactive with the nanoparticle precursor, wherein the second solvent phase separates when it is mixed with the first solvent; and
(c) combining said first and second solution mixtures in the presence of a surface stabilizing agent which is not a thiol, wherein the first and second solution mixtures phase-separate, and form nanoparticles having a surface stabilizing layer disposed thereon, and further comprising the step of collecting the nanoparticles, wherein the collected nanoparticles have an average particle size of about 1 nm to about 100 nm wherein a thickness of the surface stabilizing layer disposed on the nanoparticles is less than a diameter of the nanoparticles.

57. The method of claim 56, wherein the surface stabilizing agent does not comprise sulfur.

58. The method according to claim 56, wherein the nanoparticle precursor does not comprise gold.

59. The method according to claim 56, wherein the first mixture is provided without use of phase transfer catalyst.

60. The method according to claim 56, wherein the first solvent is an organic solvent, and the second solvent is water.

61. A method comprising:
reacting at least two precursor materials in the presence of at least one surface stabilizing agent and two immiscible solvents to form inorganic nanoparticles having a surface stabilizing layer disposed thereon at the interface of the solvents, wherein a first precursor comprises a metal ion and a second precursor comprises a reducing agent, and further comprising the step of collecting the nanoparticles having a surface stabilizing layer disposed thereon, wherein the collected nanoparticles having a surface stabilizing layer disposed thereon have an average particle size of about 1 nm to about 100 nm wherein a thickness of the surface stabilizing layer disposed on the nanoparticles is less than a diameter of the nanoparticles.

62. The method according to claim 61, wherein the nanoparticles comprise electrically conductive materials.

63. The method according to claim 61, wherein the nanoparticles comprise semiconductive materials.

64. The method according to claim 61, wherein the nanoparticles comprise electroluminescent materials.

65. The method according to claim 61, wherein the nanoparticles comprise Ag, Cu, Pt, Pd, Al, Sn, In, Bi, ZnS, ITO, Si, Ge, CdSe, GaAs, $SnO_2$, $WO_3$, SnS:Mn, ZnS:Tb, SrS, SrS:Cs, $BaAl_2S_4$, or $BaAl_2S_4$:EU, or combinations thereof.

66. The method according to claim 61, wherein the nanoparticles comprise silver.

67. The method according to claim 61, wherein nanoparticles have an average particle size of about 2 nm to about 10 nm.

68. The method according to claim 61, wherein nanoparticles have an average particle size of about 1 nm to about 20 nm.

69. The method according to claim 61, wherein nanoparticles have an average particle size of about 1 nm to about 10 nm.

70. The method according to claim 61, wherein nanoparticles have a narrow particle size distribution.

71. The method according to claim 61, wherein one of the two immiscible solvents is water.

72. The method according to claim 61, wherein one precursor material is a hydride reducing agent.

73. The method according to claim 61, wherein one precursor material is a hydroxyl producing agent.

74. The method according to claim 61, wherein the surface stabilizing agent is an amine or carboxylic acid.

75. The method according to claim 61, wherein the surface stabilizing agent is a substituted amine or substituted carboxylic acid.

76. The method according to claim 61, wherein the surface stabilizing agent does not comprise sulfur.

77. The method according to claim 61, wherein the surface stabilizing agent does not comprise thiol.

78. The method according to claim 61, wherein the reaction is carried out without phase transfer catalyst.

79. The method according to claim 61, wherein the nanoparticles are surface capped inorganic nanoparticles which can be processed into films at temperature lower than 400° C.

80. The method according to claim 61, wherein the nanoparticles are surface capped inorganic nanoparticles which can be processed into films at temperature lower than 200° C.

81. A method consisting essentially of:
(a) providing a first solution mixture consisting essentially of at least one nanoparticle precursor and at least one first solvent for the nanoparticle precursor, wherein the nanoparticle precursor consists essentially of a salt comprising a cation comprising a metal;
(b) providing a second solution mixture consisting essentially of at least one reactive moiety reactive for the nanoparticle precursor and at least one second solvent for the reactive moiety, wherein the second solvent phase separates when it is mixed with the first solvent; and
(c) combining said first and second solution mixtures in the presence of a surface stabilizing agent, wherein upon combination the first and second solution mixtures phase-separate and nanoparticles having a surface stabilizing layer disposed thereon are formed, and further comprising the step of collecting the nanoparticles having a surface stabilizing layer disposed thereon, wherein the collected nanoparticles having a surface stabilizing layer disposed thereon have an average particle size of about 1 nm to about 100 nm wherein a thickness of a surface stabilizing layer disposed on the nanoparticles is less than a diameter of the nanoparticles.

82. The method according to claim 81, wherein the first solvent consists essentially of an organic solvent, and the second solvent consists essentially of water.

83. The method according to claim 81, wherein the first mixture is provided without use of a phase transfer catalyst.

84. The method according to claim 81, wherein the salt anion is free of metal.

85. The method according to claim 81, wherein the surface stabilizing agent consists essentially of at least substituted amine or substituted carboxylic acid, wherein the substituted group comprise two to thirty carbon atoms.

86. The method according to claim 81, wherein the surface stabilizing agent consists essentially of an amino compound, or a carboxylic acid compound.

87. The method according to claim 81, wherein the first mixture consists essentially of the surface stabilizing agent, and the second mixture is free of surface stabilizing agent.

88. The method according to claim 81, wherein the combination is carried out without external application of heat or cooling.

89. The method according to claim 81, wherein the combination is carried out without application of pressure or vacuum.

90. The method according to claim 81, wherein the first mixture and the second mixture are free of compounds which can react with each other to form sulfide compounds.

91. A composition comprising:
nanoparticles comprising an amine or carboxylic acid surface stabilizing agent dispersed in at least one solvent, wherein the concentration of the nanoparticles is about 1 wt. % to about 70 wt. % and the nanoparticles have an average size of about 1 nm to about 20 nm, and a monodispersity showing standard deviation of about 3 nm or less, and wherein a thickness of a surface stabilizing layer on the nanoparticles is less than a diameter of the nanoparticles.

92. The composition according to claim 91, wherein the concentration is about 5 wt. % to about 40 wt. %.

93. The composition according to claim 91, wherein the solvent is an organic solvent.

94. The composition according to claim 91, wherein the nanoparticles comprise a metal.

95. The composition according to claim 91, wherein the nanoparticles comprise a metal oxide.

96. The composition according to claim 91, wherein the nanoparticles comprise an electrically conductive material.

97. The composition according to claim 91, wherein the nanoparticles comprise a semiconductive material.

98. The composition according to claim 91, wherein the nanoparticles comprise an electroluminescent material.

99. The composition according to claim 91, wherein the nanoparticles have an average particle size of about 1 nm to about 10 nm.

100. The composition according to claim 91, wherein the nanoparticles do not comprise gold.

101. A composition comprising (i) metallic nanoparticles showing a DSC sintering temperature exothermic peak between about 110° C. to about 160° C. and (ii) a surface stabilizing layer disposed on the nanoparticles, a thickness of which layer is less than a diameter of the nanoparticles, and wherein the nanoparticles have an average particle size of about 1 nm to about 100 nm.

102. The composition according to claim 101, wherein the nanoparticles are silver nanoparticles.

103. The composition according to claim 101, wherein the nanoparticles further show a TGA weight loss beginning at about 100° C.

* * * * *